Nov. 18, 1941.   J. D. KEVORKIAN   2,263,531
FRUIT CORER
Filed Jan. 7, 1941
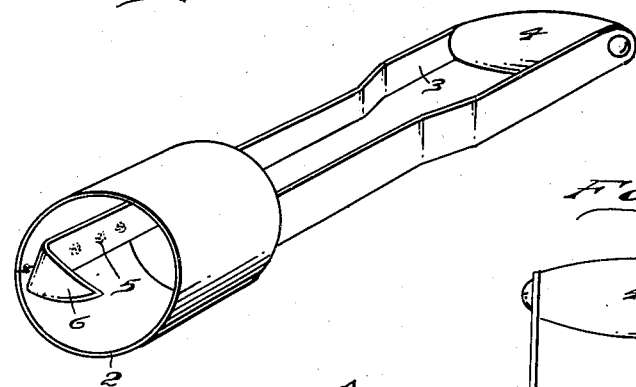
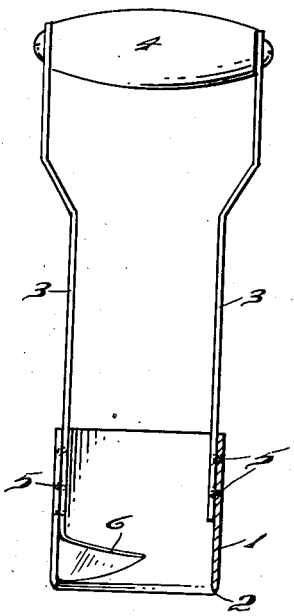
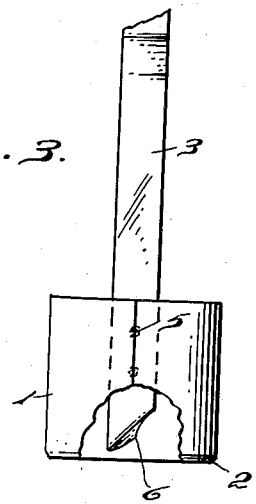
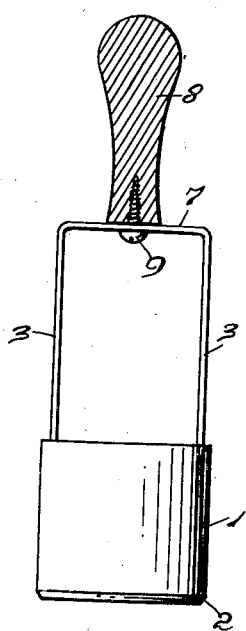
INVENTOR
Joseph D. Kevorkian
BY
Herbert P. Fairbanks
ATTORNEY Patented Nov. 18, 1941

2,263,531

UNITED STATES PATENT OFFICE 2,263,531

FRUIT CORER

Joseph D. Kevorkian, Philadelphia, Pa.

Application January 7, 1941, Serial No. 373,418

2 Claims. (Cl. 30—302)

The object of this invention is to device a novel and efficient fruit corer which can be economically manufactured from a minimum number of parts.

A further object of the invention is to devise a fruit corer having a cylindrical body portion with a cutting edge at its forward end, and with one side of the handle terminating at its forward end, in an angularly disposed cutting blade within said body portion and in rear of said cutting edge.

With the above and other objects in view as will hereinafter clearly appear, my invention comprehends a novel construction and arrangement of a corer for cutting out and removing the cores from oranges, grape fruit, apples, melons, pine apples and other core containing fruits.

It further comprehends a novel core remover having a cylindrical body portion presenting at its forward end a cutting edge, and having a handle, one side of which terminates in a cutting blade angularly disposed within the body portion a desired distance in rear of said cutting edge.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a perspective view of a fruit corer, embodying my invention.

Figure 2 is a sectional elevation.

Figure 3 is a side elevation with the body portion partly broken away.

Figure 4 is an elevation of another embodiment of the invention, partly in section.

Similar numerals indicate corresponding parts.

Referring to the drawing:

1 designates the body portion of a fruit corer embodying my invention. The body portion 1 is preferably formed of non-oxidizable metal such as for example stainless steel, and it is preferably cylindrical in cross section, with an annular cutting edge 2 at its forward end.

The handle is formed of two side arms 3 connected with a grasping portion 4 in any desired manner. The side arms 3 extend into the body portion 1 and are secured thereto by riveting or spot welding as at 5.

One of the side arms 3 is angularly bent to form a cutting blade 6 at its forward end. The cutting blade, preferably has its cutting edge curving inwardly towards the median line of the body portion and is disposed in rear of the cutting edge at the forward end of the body portion.

The cutting blade 6 is deflected laterally from its side arm and angularly disposed thereto and to the plane of the cutting edge of the body portion.

When the fruit corer is pressed against the fruit, the cutting edge of the body portion cuts through the skin, and, upon the rotation of the corer, the cutting blade will separate the front end of the core from the fruit. If the corer is rotated as it is pushed into the fruit, a rotary motion is imparted to the cutting blade.

Special attention is directed to the fact that the cutting blade is formed from one of the side arms of the handle so that it is integral with such side arm. This not only reduces the number of parts but eliminates the necessity of an additional operation to make a separate blade and an additional operation to fasten the blade to the body portion.

In the embodiment seen in Figure 4, the side arms are connected by a laterally deflected portion 7, to which a handle 8 is secured by a fastening device 9 of any desired type. The body portion 1 and the cutting blade 6 are the same as shown in the other figures of the drawing.

Having thus described my invention, what I claim as new and desire to secure by Letters Patent is:

1. A fruit corer, comprising a tubular body portion, and a handle, the body portion having a cutting edge at its forward portion, said handle having two arms extending into the body portion and fixed to its inner face, one of said arms in rear of and in close proximity to said cutting edge being bent laterally and angularly and shaped to form a cutting blade integral with its arm and terminating in proximity to the median line of the body portion.

2. A fruit corer, comprising a tubular body portion, and a cutting blade secured with same and bent laterally and angularly and terminating in proximity to the median line of the said portion.

JOSEPH D. KEVORKIAN.